US009431954B2

(12) United States Patent
Shr et al.

(10) Patent No.: US 9,431,954 B2
(45) Date of Patent: Aug. 30, 2016

(54) SOLAR CELL MEASUREMENT SYSTEM AND SOLAR SIMULATOR

(75) Inventors: Ren Chin Shr, Tianliao Village (TW); Si Xian Li, Kengkou Village (TW); Hung Sen Wu, Taoyuan (TW); Teng Chun Wu, Hsinchu (TW); Wei Yun Liang, Hsinchu (TW); Chen Wei Chen, Xihu Township, Changhua County (TW); Syh Homg Chen, Hsinchu (TW)

(73) Assignee: Industrial Technology Research Institute, Hisinchu (TW)

( * ) Notice: Subject to any disclaimer, the term of this patent is extended or adjusted under 35 U.S.C. 154(b) by 936 days.

(21) Appl. No.: 12/874,600

(22) Filed: Sep. 2, 2010

(65) Prior Publication Data

US 2011/0241719 A1  Oct. 6, 2011

(30) Foreign Application Priority Data

Apr. 6, 2010  (TW) .............................. 99110502 A

(51) Int. Cl.
*G01R 13/26* (2006.01)
*H02S 50/10* (2014.01)

(52) U.S. Cl.
CPC .................................... *H02S 50/10* (2014.12)

(58) Field of Classification Search
CPC ......... H02S 50/00; H02S 50/10; H02S 50/15
USPC .......................... 324/761.01, 760.01–760.02, 324/750.15–750.16, 754.22–754.23, 324/762.05–762.07, 30–33; 250/336.1, 250/339.02–339.06, 341.8, 203.2–203.4; 438/14–18
See application file for complete search history.

(56) References Cited

U.S. PATENT DOCUMENTS

| 4,163,194 | A | * | 7/1979 | Ross .......................... 324/761.01 |
| 4,640,002 | A | * | 2/1987 | Phillips et al. .................. 438/12 |
| 5,623,149 | A | * | 4/1997 | Kilmer ........................ 250/495.1 |
| 5,997,155 | A | * | 12/1999 | Ducharme et al. ........... 362/298 |
| 6,169,414 | B1 | * | 1/2001 | Yoshino et al. ......... 324/761.01 |
| 6,548,819 | B1 | | 4/2003 | Lovelady |
| 7,067,831 | B2 | | 6/2006 | Ahrens et al. |

(Continued)

FOREIGN PATENT DOCUMENTS

| CN | 101290340 A | * | 10/2008 |
| CN | 101551437 A | | 10/2009 |

(Continued)

OTHER PUBLICATIONS

Office Action issued by the China State Intellectual Property Office on Nov. 16, 2012.

(Continued)

*Primary Examiner* — Jermele M Hollington
*Assistant Examiner* — Demetrius Pretlow
(74) *Attorney, Agent, or Firm* — Jianq Chyun IP Office

(57) ABSTRACT

A measurement system having a light source, a holding device, and a measurement device. The light source includes a plurality of light emitting diodes (LEDs) configured to generate light beams with different wavelengths, and the emission spectrum of the light source complies with a predetermined standard. The holding device is configured to hold an object under test. The measurement device is configured to measure the electrical properties of the object under test after the object under test is illuminated by the light source.

29 Claims, 6 Drawing Sheets

(56) References Cited

U.S. PATENT DOCUMENTS

| | | | |
|---|---|---|---|
| 7,309,850 B2* | 12/2007 | Sinton et al. | 250/203.4 |
| 7,411,408 B2 | 8/2008 | Shimotomai et al. | |
| 7,504,845 B2* | 3/2009 | Cader et al. | 324/750.09 |
| 7,733,111 B1* | 6/2010 | Zhao et al. | 324/761.01 |
| 8,057,068 B2* | 11/2011 | Kwo | 362/263 |
| 2002/0014886 A1* | 2/2002 | Matsuyama | 324/96 |
| 2002/0171441 A1* | 11/2002 | Jayamaha | 324/752 |
| 2004/0020529 A1* | 2/2004 | Schutt et al. | 136/245 |
| 2005/0047135 A1* | 3/2005 | Rhoads et al. | 362/240 |
| 2005/0190557 A1* | 9/2005 | Zhan et al. | 362/294 |
| 2005/0230600 A1* | 10/2005 | Olson et al. | 250/214.1 |
| 2007/0115658 A1* | 5/2007 | Mueller et al. | 362/231 |
| 2007/0165202 A1* | 7/2007 | Koehler et al. | 355/67 |
| 2008/0055534 A1* | 3/2008 | Kawano | 349/161 |
| 2008/0111983 A1* | 5/2008 | Singer et al. | 355/69 |
| 2009/0323028 A1* | 12/2009 | Shanley | 353/31 |
| 2010/0073011 A1* | 3/2010 | Svidenko et al. | 324/537 |
| 2010/0237895 A1* | 9/2010 | Chung | 324/766 |

FOREIGN PATENT DOCUMENTS

| | | | |
|---|---|---|---|
| JP | 2001274438 A | 10/2001 | |
| TW | 552409 B | 9/2003 | |
| TW | 200930951 A | 7/2009 | |
| WO | WO 2006046654 A1 * | 5/2006 | G02B 27/1053 |

OTHER PUBLICATIONS

Summary Translation of Office Action and abstracts of CN 101551437 and CN 101290340.

Office Action issued by the Taiwan Intellectual Property Office on Dec. 25, 2012.

* cited by examiner

SOLAR CELL MEASUREMENT SYSTEM AND SOLAR SIMULATOR

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present disclosure relates to a solar cell measurement system and a solar simulator.

2. Description of Related Art Including Information Disclosed Under 37 CFR 1.97 and 37 CFR 1.98.

With diminishing energy resources in recent years, solar modules have become more and more popular in production, manufacture, and verification. Measurement systems using solar simulators are required in production line and validation organizations since the solar simulator can provide a steady-state light source at any time and any place.

A solar simulator is an emission apparatus that can reconstruct solar spectral distribution very accurately. The solar simulator is necessary for some solar products when functional tests, such as testing of conversion efficiency of a solar cell or an accelerated aging test of a solar cell, are performed. With the increasing popularity of the solar modules, the market for such solar simulators is growing.

Solar simulator technology has developed for decades, and a variety of products are currently available. However, most of them are fabricated by a xenon lamp, causing the products to have such disadvantages as short lifespan and high cost. A prior art solar simulator combines an incandescent lamp with a xenon lamp as a light source, and the simulated light is implemented by filtering infrared light of the incandescent lamp with a filter plate and incorporating infrared light of the xenon lamp. Spectral distribution of the simulated light with such combination is close to an actual solar spectral distribution. However, the structure of this solar simulator is complicated, and the xenon lamp has a short lifespan, high power consumption and high price, limiting the benefits of its use.

Another prior art flash-based solar simulator also uses a xenon lamp as a light source. The simulator can simulate the sun light in a very short time, which is similar to a photoflash, and a typical xenon lamp can flash one hundred thousand times. In addition to the aforementioned disadvantages of the xenon lamp, the flash-based solar simulator cannot be used in reliability tests, such as an accelerated aging test or a light soaking test. In addition, when a test for a solar module is performed, the total test time needs to be very short, and the simulator with such structure will increase the measurement cost.

A prior art measurement method using a flash-based solar simulator measures properties of a solar cell in accordance with an irradiance detector and an electronic load. The method measures the properties of the solar cell by using the solar simulator having a short pulse flash, and the duration of the pulse is between 1 and 100 milliseconds.

BRIEF SUMMARY OF THE INVENTION

The present disclosure provides a measurement system. A measurement system according to this aspect of the disclosure comprises a light source, a holding device, and a measurement device. In one embodiment of the disclosure, the light source includes a plurality of light emitting diodes (LEDs) configured to generate light beams with different wavelengths, and the emission spectrum of the light source complies with a predetermined standard. In one embodiment of the disclosure, the holding device is configured to hold an object under test, the measurement device is configured to measure the electrical properties of the object under test after the object under test is illuminated by the light source.

Another aspect of the disclosure provides a solar simulator. In one embodiment of the disclosure, the solar simulator comprises a cooling system, a holding device, a light source array, and an optical system. In one embodiment of the disclosure, the holding device is configured to hold an object under test, the light source array is attached to the cooling system and is configured to generate light beams, the optical system is configured to enhance the uniformity of the object under test illuminated by the light source array, the light source array comprises a plurality of light emitting diodes (LEDs) configured to generate light beams with different wavelengths, and the emission spectrum of the solar simulator complies with a predetermined standard.

Another aspect of the disclosure provides an aging test system. In one embodiment of the disclosure, the aging test system for a solar cell comprises a light source, a cooling system, a holding device, an irradiance measurement device, and a temperature measurement device. In one embodiment of the disclosure, the light source includes a plurality of LEDs configured to generate light beams with different wavelengths, and the emission spectrum of the light source complies with a predetermined standard. In one embodiment of the disclosure, the cooling system is configured to attach to the light source, the holding device is configured to hold an object under test illuminated by the light source, the irradiance measurement device is configured to measure the irradiance of the light source, and the temperature measurement device is configured to measure the temperature of the object under test.

The foregoing has outlined rather broadly the features and technical advantages of the disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed might be readily utilized as a basis for modifying or designing other structures or processes for carrying out the same purposes of the disclosure. It should also be realized by those skilled in the art that such equivalent constructions do not depart from the spirit and scope of the disclosure as set forth in the appended claims.

BRIEF DESCRIPTION OF THE SEVERAL VIEWS OF THE DRAWINGS

The accompanying drawings, which are incorporated in and constitute a part of this specification, illustrate embodiments of the disclosure and, together with the description, serve to explain the principles of the disclosure.

DETAILED DESCRIPTION OF THE INVENTION

Exemplary embodiments will now be described more fully with reference to the accompanying drawings. The embodiments may, however, be embodied in many different forms and should not be construed as limited to the embodiments set forth herein. Rather, these embodiments are provided so that this disclosure will be thorough and complete, and will fully convey the scope of the embodiments to those skilled in the art.

Figure 1:
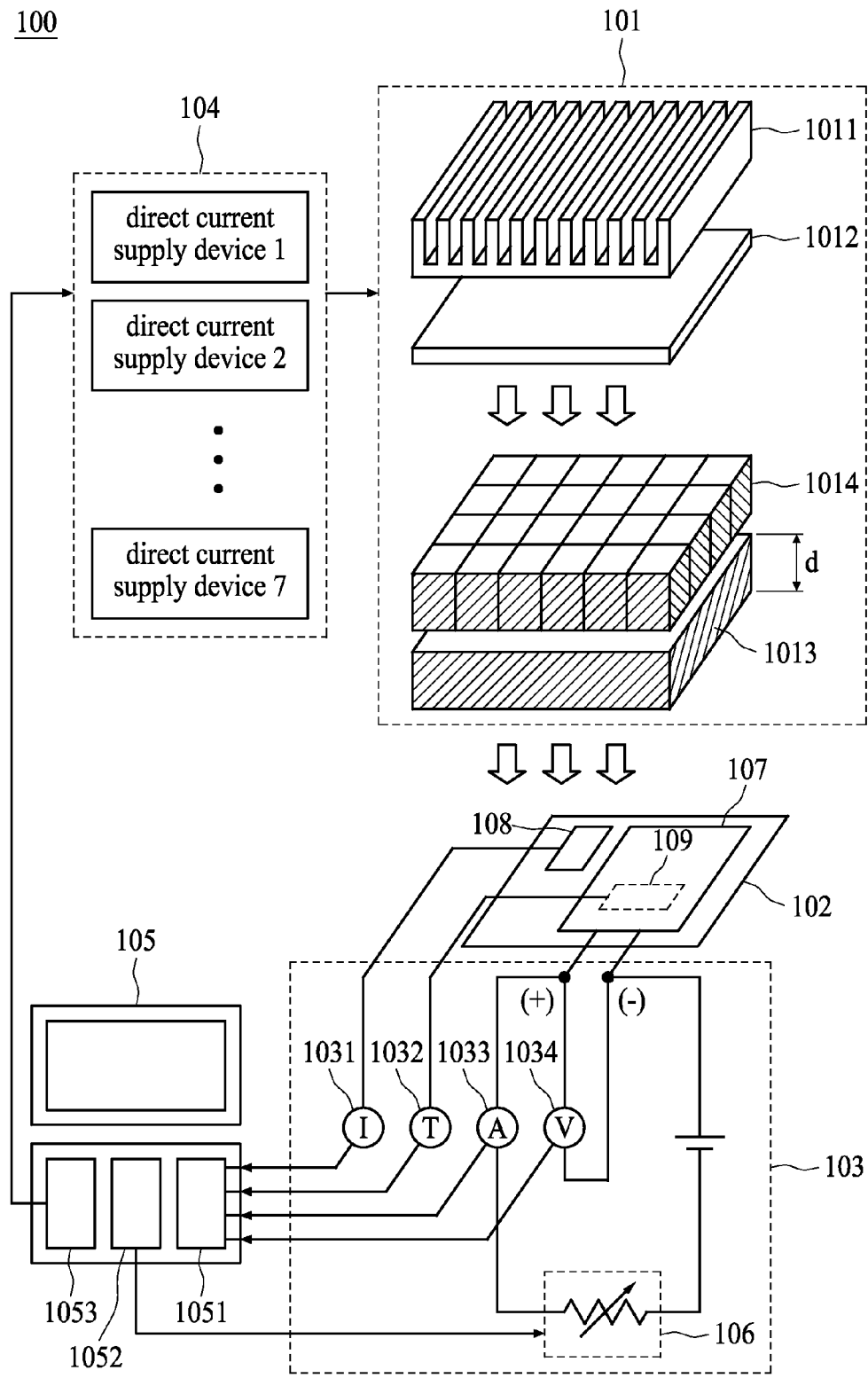
FIG. 1 shows a measurement system for a solar cell according to one embodiment of the present disclosure.

FIG. 1 shows a measurement system 100 for a solar cell according to one embodiment of the present disclosure. The measurement system 100 comprises a light source 101, a holding device 102, a measurement device 103, a direct current supply device 104, and a computer system 105. The light source 101 is configured to generate light beams, which complies with International Electrotechnical Commission (IEC)-60904-9 ed2.0 Class B, IEC-60904-9 ed2.0 Class A, Japanese Industrial Standard (JIS) C 8933:2005 Class B, or JIS C 8933:2005 Class A standards. The light source 101 is composed of a plurality of light emitting diodes (LEDs) configured to generate light beams with different wavelengths. The LED has the advantage of small volume and can be arranged in an array type.

Unlike a solar simulator composed of a single light source, a LED solar simulator comprises a plurality of LEDs with various wavelengths, and the selection of LEDs is base on the requirement of IEC-60904. The disclosure combines the distribution with the spectral distribution of LEDs in order to generate the necessary irradiance and spectral distribution, since various kinds of LEDs have different spectral distributions and emission intensities.

In addition, when LEDs are arranged in an array type, the emission area is enlarged, the irradiance and the uniformity are enhanced, and the size of the array can vary according to requirements. The optical structure of the light source of the solar simulator of the present invention is simpler than the solar simulator of the prior art. In addition, an LED solar simulator offers additional benefits such as low cost, long lifespan, and low power consumption.

According to one embodiment of the present disclosure, the emission spectrum of the light source 101 complies with IEC-60904-9 ed2.0 Class A standard and JIS C 8933:2005 Class A standard. According to one embodiment of the present disclosure, the light source 101 can generate an irradiance of 100-2000 W/m$^2$ on an illuminated surface. According to one embodiment of the present disclosure, the light source 101 comprises a light source array 1012. The light source array 1012 is an aluminum substrate with circuits mounted on a single surface. A plurality of LEDs are mounted on the single surface, and a cooling system, such as a cooling fin 1011, is attached to the other surface. The cooling system can comprise a metal substrate circuit board or a ceramic substrate circuit board to conduct heat. The light source array 1012 can be, but is not limited to, seven kinds of LEDs with different wavelengths. The spectral range of the light source generated from the light source 101 is approximately 0.3 to 1.1 μm. In addition, the light source 101 also comprises an optical integrator 1013, which is composed of four reflection mirrors. The reflection mirror can be a plane mirror or an embossed mirror made up of aluminum. Therefore, the light with different wavelengths generated from the light source array 1012 can be mixed adequately so as to enhance uniformity of the light on an illuminated surface or on an object. The optical integrator is used to make the uniformity of the light on the illuminated surface comply with the requirement of IEC-60904 Class A standard or JIS C 8933:2005 Class A standard. Referring to FIG. 1, the optical integrator can further combine with an optical integrator array 1014. The optical integrator array 1014 is used to enhance the mixing of the light from different kinds of LEDs. By using the optical integrator array 1014, the depth d of the optical integrator 1013 can be reduced, and the uniformity of the light can be further enhanced.

The holding device 102 in FIG. 1 is configured to hold an object under test 107. The holding device 102 can be connected to a temperature control device 1032 to control the temperature of its surface and maintain the object under test 107 at a constant temperature. In addition, the holding device 102 can cooperate with a belt conveyer (not shown), so that a next object under test can be replaced automatically after the measurement of the object under test 107 is completed. In addition, the holding device 102 can cooperate with a landing (not shown) to adjust the distance between the object under test 107 and the light source 101. According to one embodiment of the present disclosure, the object under test 107 is a solar cell. The measurement device 103 comprises a voltage measurement device 1034 and a current measurement device 1033 used to measure the voltage and current of the object under test 107 after the object under test 107 is illuminated by the light source. An I-V characteristics curve is obtained after the measurement. In addition, according to one embodiment of the present disclosure, the measurement device 103 comprises a load 106, such as a resistor, a variable resistor, a resistor array, a transistor, a MOSFET transistor, or an electronic load. The value of the load 106 can be a constant, manual adjustment, or a variable controlled by a program. The direct current supply device 104 has seven driving channels for providing stable current or instantaneous current. These currents are used to drive the seven kinds of LEDs with different wavelengths so as to control the intensity or spectrum of the light source generated from the light source 101. If the current requirement of certain kinds of LEDs is similar, the certain kinds of LEDs can be connected in series to reduce the number of the channels so as to reduce the cost.

Referring to FIG. 1, the measurement device 103 comprises an irradiance measurement device 1031, which is used to measure the irradiance of the light source received by a detection unit 108 on the holding device 102. The measurement device 103 further comprises a temperature measurement device 1032, which is used to measure the temperature of a temperature sensing unit 109 attached below the object under test 107. According to one embodiment of the present disclosure, the computer system 105 comprises a data acquisition unit 1051, a load control signal generating unit 1052, and a multichannel control signal generating unit 1053. A user can control the action of different units and acquisition of data by programs in the computer system 105. For example, the multichannel control signal generating unit 1053 is used to control the direct current supply device 104 for adjusting the intensity, spectral distribution, and emission time of the light source generated from the light source 101. Alternatively, the value of the load 106 can be altered by the load control signal generating unit 1052 when the light source generates light. After the value of the load 106 is altered, the data of current, voltage, irradiance, and temperature is obtained by the data acquisition unit 1051. Subsequently, different values of the load are altered and the data acquisition actions are repeated so as to measure the property received by the object under test in different load conditions or in different irradiance conditions. However, the disclosure is not limited to this embodiment.

Figure 2:
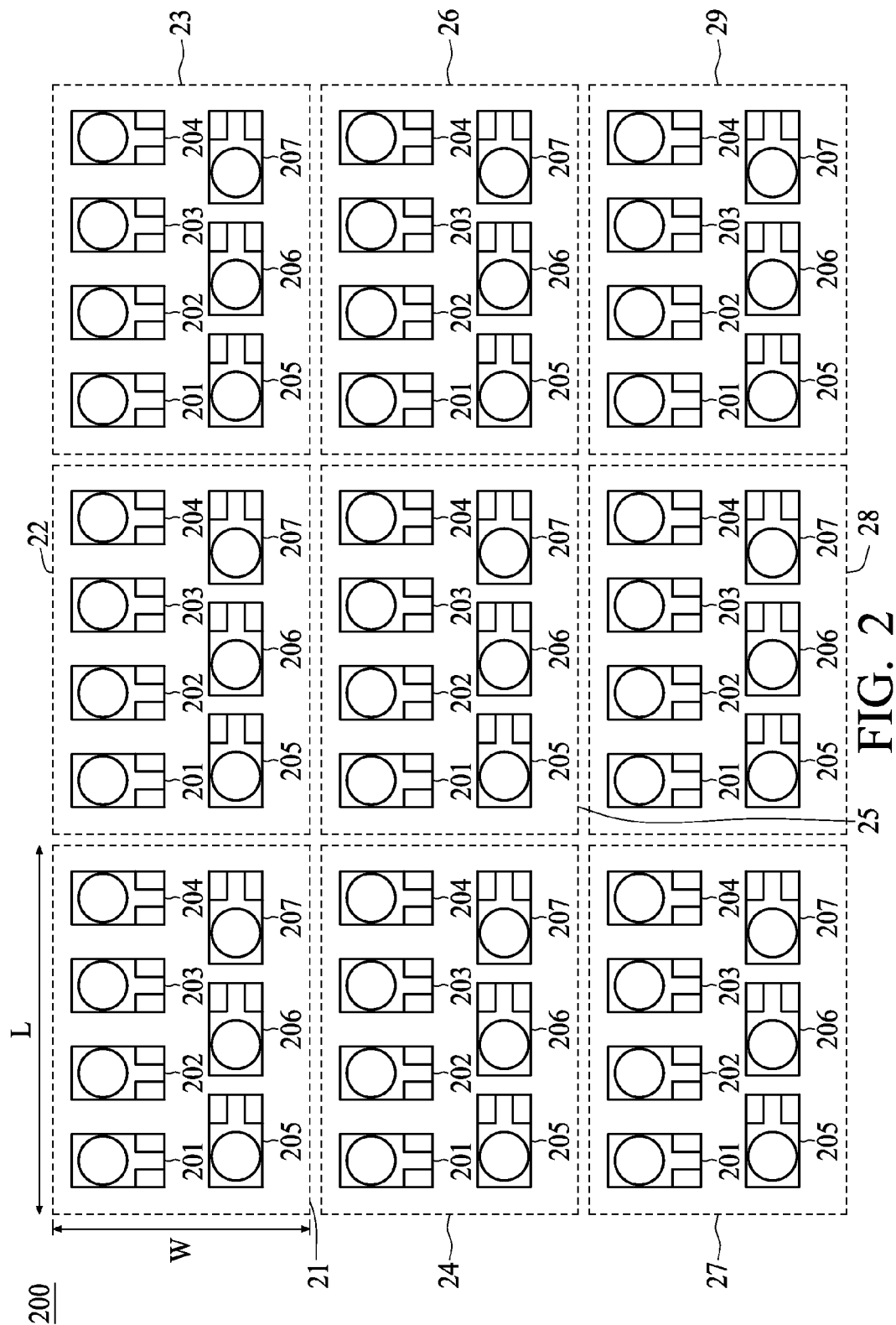
FIG. 2 shows a diagram of an arrangement of an LED array of the light source according to one embodiment of the present disclosure.

Since the light source 101 is used to measure a solar cell, it should comply with the related standards of a solar simulator, such as IEC-60904 or JIS standard. From the spectral irradiance table of the standard, a solar simulator is required to emit light with a sufficient irradiance at a specific wavelength range. FIG. 2 shows a diagram of an arrangement of an LED array 200 of the light source 101 according to one embodiment of the present disclosure. The LED array 200 comprises a plurality of array elements 21 to 29. Each array element comprises a plurality of LEDs with different wavelengths. According to one embodiment of the present disclosure, each array element comprises at least one LED having fluorescence film. According to another embodiment of the disclosure, the array element 21 comprises an LED 201 with a main wavelength between 300 and 400 nm, an LED 202 with a main wavelength between 400 and 500 nm, an LED 203 with a main wavelength between 500 and 600 nm, an LED 204 with a main wavelength between 600 and 700 nm, an LED 205 with a main wavelength between 700 and 800 nm, an LED 206 with a main wavelength between 800 and 900 nm, and an LED 207 with a main wavelength between 900 and 1100 nm, wherein the LED 204 comprises a blue LED chip and fluorescence film, and the spectral range is approximately 500 to 700 nm after the fluorescence film is excited by blue light. According to another embodiment of the disclosure, the main wavelength of the selected LED 201 is 395 nm, the main wavelength of the LED 202 is 465 nm, the main wavelength of the LED 203 is 510 nm, the main wavelength of the LED 204 is 615 nm, the main wavelength of the LED 205 is 740 nm, the main wavelength of the LED 206 is 850 nm, and the main wavelength of the LED 207 is 940 nm. Therefore, the emission intensity of each LED can be adjusted by different value of the current supplied by the direct current supply device 104, and thus the light source illuminating the object under test can be produced.

According to one embodiment of the present disclosure, the cover area of the LED array element 21 is the product of width W and length L, and the area is approximately between 1 cm$^2$ and 50 cm$^2$. The periodic arrangement of the LED array 200 shown in FIG. 2 is not the only possible periodic arrangement. The best arrangement of the LED array 200 is arranged according to a combination of variables including the LED type, the irradiance of the LED with different wavelengths, and the shape of the optical integrator. The combination of variables is used to achieve a uniform mixing light and obtain an LED array which meets the requirements. For example, the LED array element 21 can be composed of an LED 201 with a main wavelength of 395 nm, an LED 202 with a main wavelength of 465 nm, an LED 203 with a main wavelength of 510 nm, two LEDs 204 with a main wavelength of 615 nm, an LED 205 with a main wavelength of 740 nm, an LED 206 with a main wavelength of 850 nm, and two LEDs 207 with a main wavelength of 940 nm.

Figure 3:
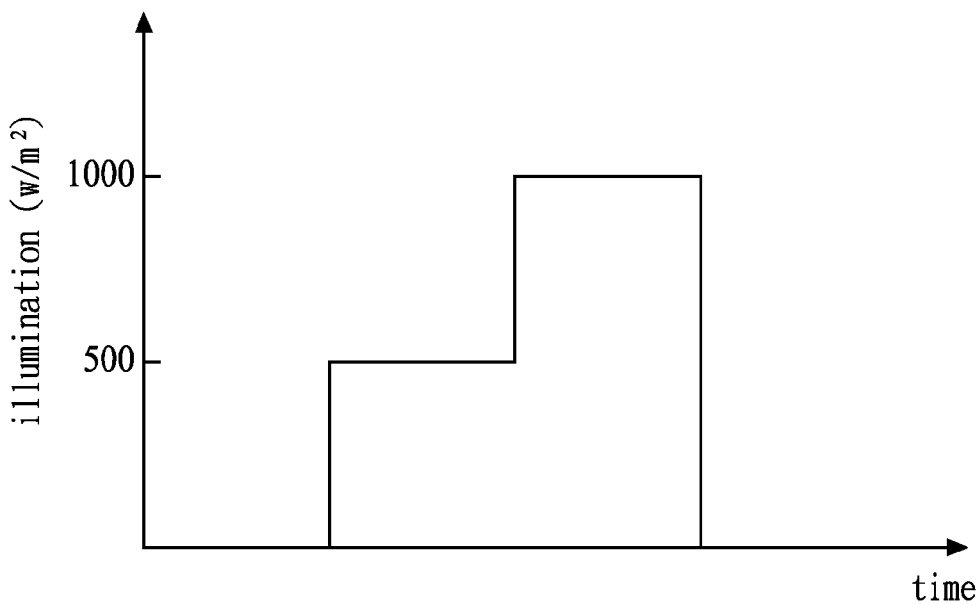
FIG. 3 shows an irradiance variation in which current is output in a step form.
Figure 4:
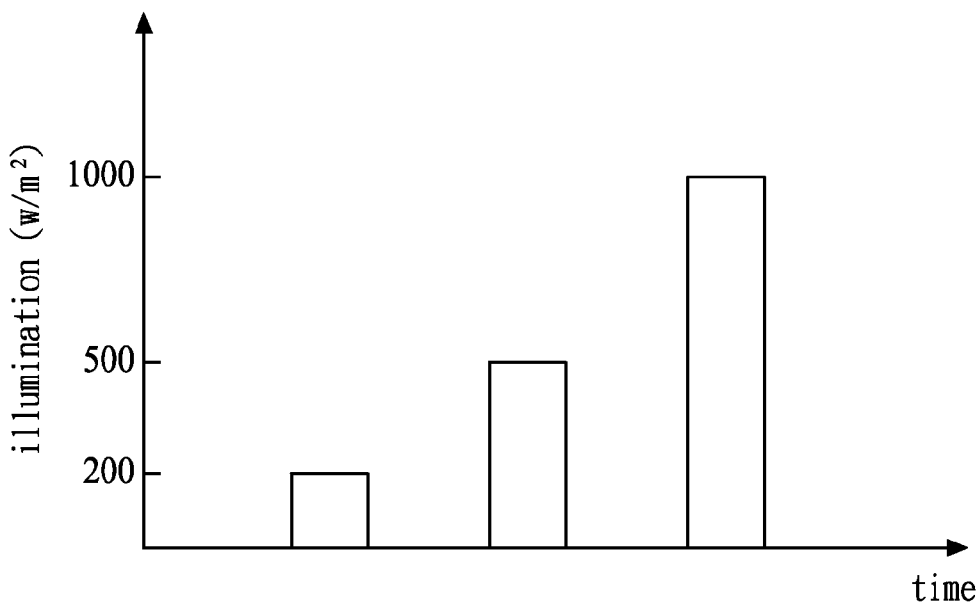
FIG. 4 shows an irradiance variation in which an instantaneous current is output.

The direct current supply device 104 can not only provide a stable current for LED, but can also provide an instantaneous current with a similar square wave by a switch so that the LED can emit in a short time and generate a flash exceeding 100 milliseconds. In addition, different irradiance is generated by altering the value of driving current, and the variation of a solar cell is measured under different irradiance. According to an algorithm of IEC 60891 standard, a serial resistance ($R_S$) of the equivalent model of the solar cell can be calculated by measuring solar cell properties in different irradiance conditions. FIG. 3 shows an irradiance variation in which current is output in a step form. An I-V characteristics curve of the object under test under irradiances of 500 W/m$^2$ and 1000 W/m$^2$ can be measured quickly in this current waveform. FIG. 4 shows an irradiance variation in which an instantaneous current is output. The instantaneous current is a pulse current with different peak value, and a solar simulator can generate irradiance with different intensity by the different peak value of the instantaneous current. An I-V characteristics curve of the object under test under irradiances of 200 W/m$^2$, 500 W/m$^2$, and 1000 W/m$^2$ can be measured quickly in this current waveform, and thus the serial resistance of the solar cell can be calculated. However, the disclosure is not limited to this embodiment.

Figure 5:
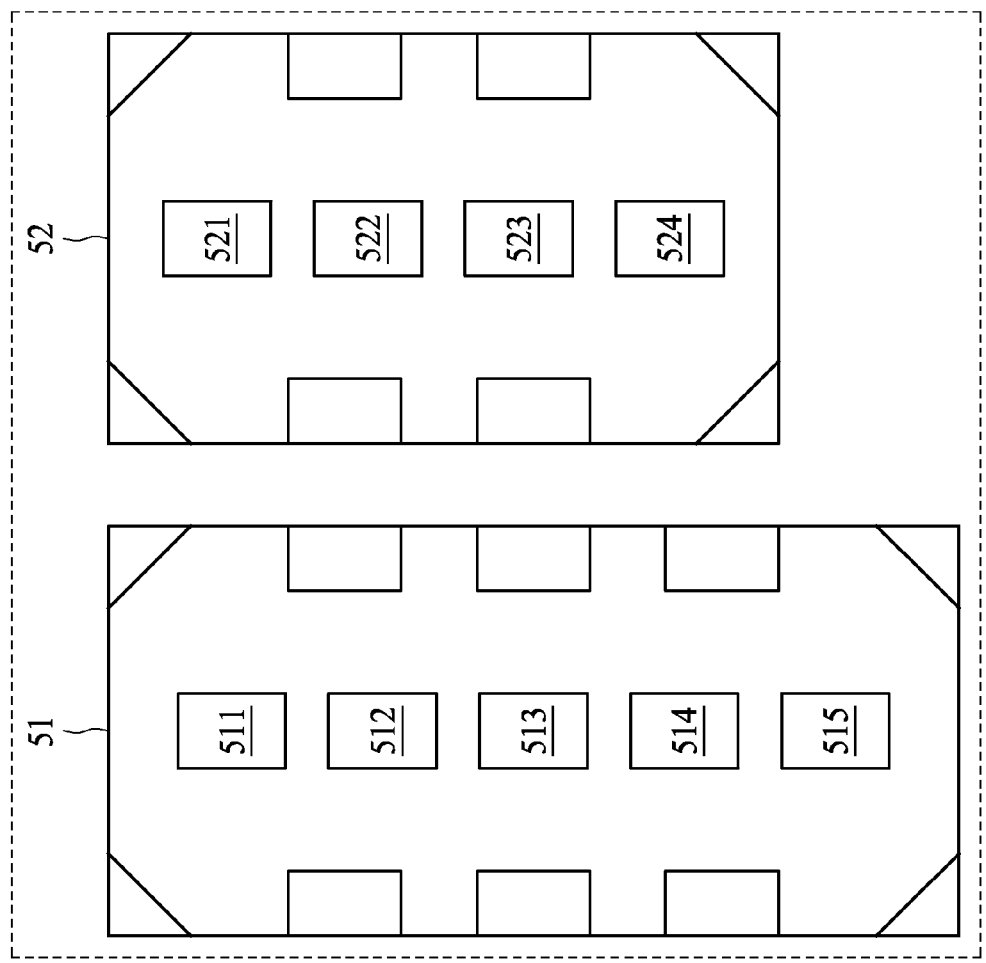
FIG. 5 shows a package diagram of the array elements 21 to 29 according to another embodiment of the present disclosure.

In addition, LED chips with different wavelengths can be packaged in a single LED so as to improve the density of the LED chips. In this way, the number of the LED devices can be reduced, and the mixing of light can be more uniform. FIG. 5 shows a package diagram of the array elements 21 to 29 according to another embodiment of the present disclosure, wherein the array element 21 comprises two LEDs 51 and 52. The LED 51 comprises five LED chips 511 to 515 with a multi-chip package, wherein the emission wavelength of the LED chip 511 is 395 nm, the emission wavelength of the LED chip 512 is 465 nm, the emission wavelength of the LED chip 513 is 510 nm, and the emission wavelength of the LED chips 514 and 515 is 615 nm. The LED 52 comprises four LED chips 521 to 524 with a multi-chip package, wherein the emission wavelength of the LED chip 521 is 740 nm, the emission wavelength of the LED chip 522 is 850 nm, and the emission wavelength of the LED chips 523 and 524 is 940 nm. The current LED package technique is classified into two kinds: flip chip technique and wire bond technique. In this embodiment, the chips 511 to 515 of the LED 51 are flip chip packages, and the chips 521 to 524 of the LED 51 are wire bond packages. However, the disclosure is not limited to this embodiment.

In addition, the LED solar cell measurement system of the disclosure can be used to measure the spectrum response of a solar cell. The operation method is to measure the value of a short current in a standard condition at first. Next, the irradiance of a certain kind of LEDs, such as the LED 202 with a main wavelength of 465 nm, is reduced slightly, and the same measurement is performed again. Therefore, the approximate spectrum response of the solar cell at a wavelength of 465 nm is obtained. In this way, seven kinds of LEDs with different wavelengths in the embodiment can obtain seven data points in a spectrum response curve (X-axis current signal and the Y-axis wavelength signal). Using more LEDs with different wavelengths in the solar simulator allows obtaining a more accurate spectrum response curve. However, the disclosure is not limited to this embodiment.

Figure 6:
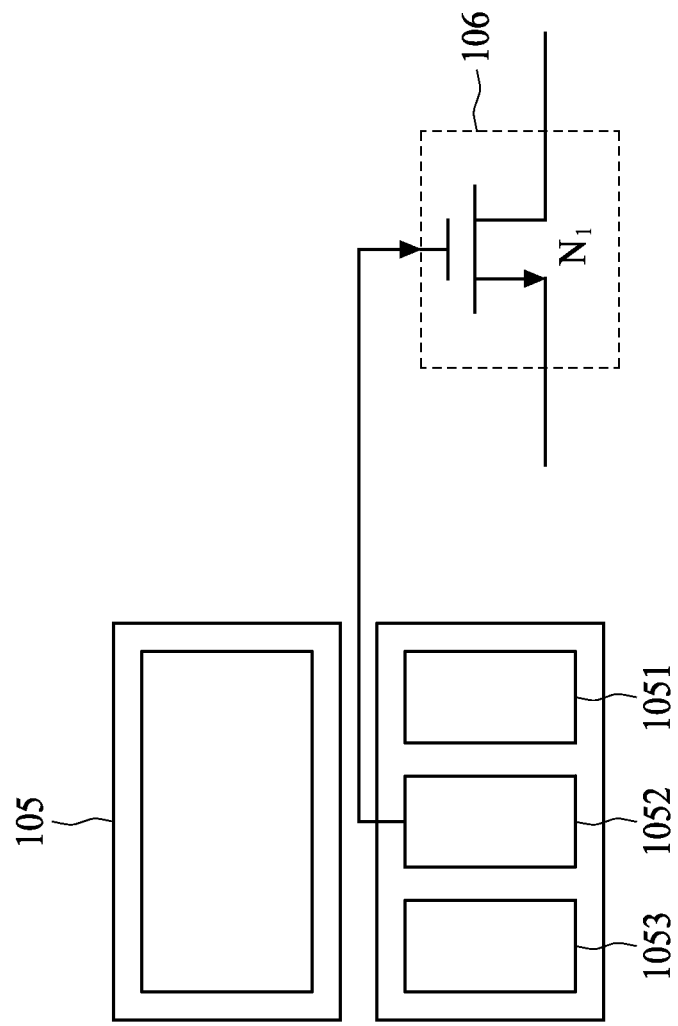
FIG. 6 shows a circuit diagram of the load according to one embodiment of the present disclosure.
Figure 7:
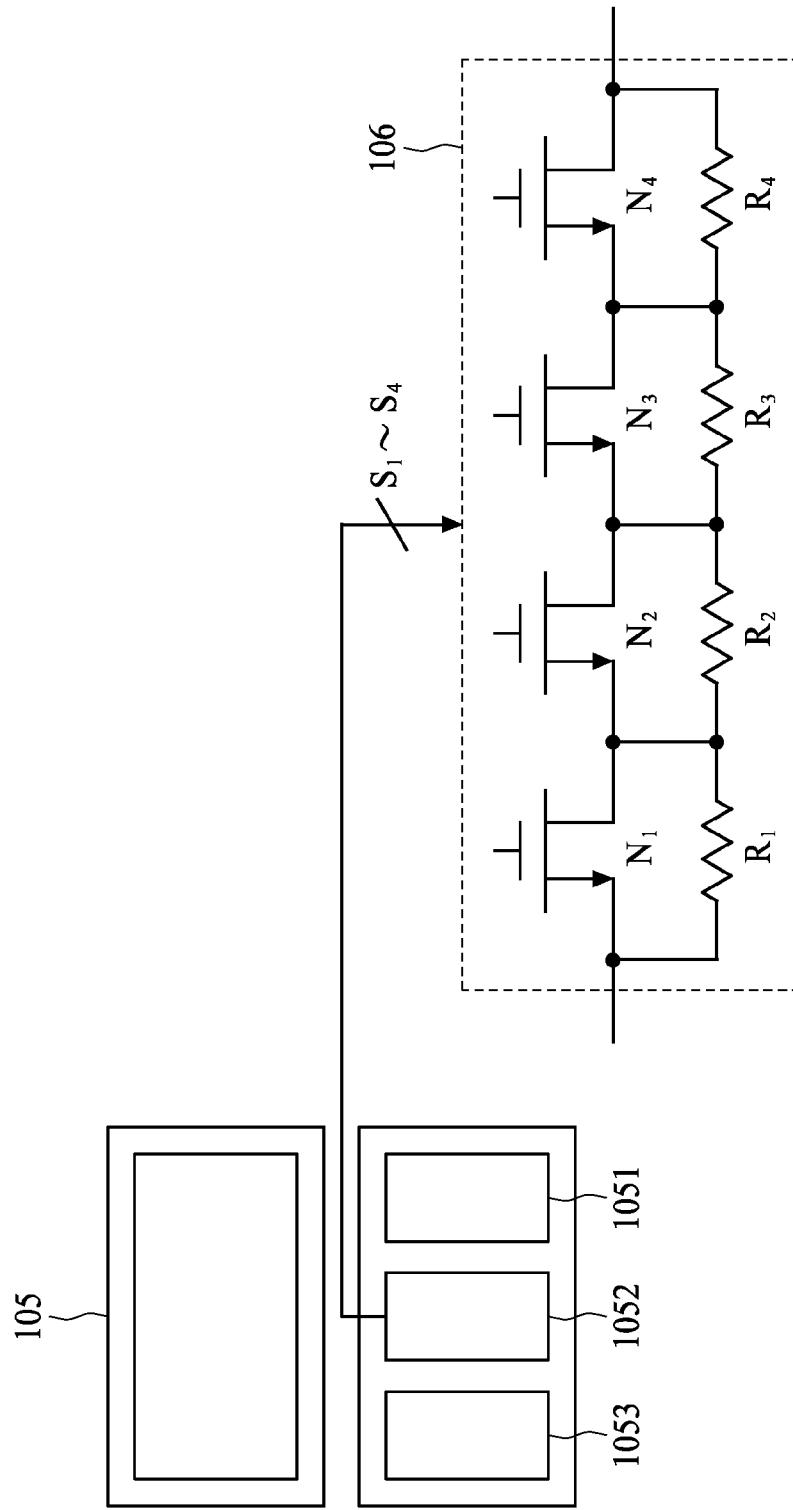
FIG. 7 shows a circuit diagram of the load according to another embodiment of the present disclosure.

FIG. 6 shows a circuit diagram of the load 106 according to one embodiment of the present disclosure. According to the embodiment, the load 106 is implemented by an NMOS transistor $N_1$. Referring to FIG. 6, a load control program in the computer system 105 outputs a signal to a load control signal generating unit 1052 for generating a control signal. The resistance of the NMOS transistor $N_1$ can be adjusted by the control signal. FIG. 7 shows a circuit diagram of the load 106 according to another embodiment of the present disclosure. In this embodiment, the load 106 is composed of a set of NMOS transistors $N_1$ to $N_4$ connected in series and a set of resistors $R_1$ to $R_4$ connected in series, wherein the set of NMOS transistors $N_1$ to $N_4$ and the set of resistors $R_1$ to $R_4$ are connected in parallel. Referring to FIG. 7, the load control program in the computer 105 outputs signals to the load control signal generating unit 1052 for generating a plurality of control signals $S_1$ to $S_4$. The NMOS transistors $N_1$ to $N_4$ can be turned on selectively according to the control signals $S_1$ to $S_4$, so that the equivalent series resistance of the load 106 can be selectively adjusted. The switching resistance range of the load 106 can be increased by connecting more NMOS transistors and resistors in series. However, the disclosure is not limited to this embodiment.

In conclusion, the solar cell measurement system of the disclosure can simulate solar spectra in different conditions, such as in the evening or in the morning, without replacing filter plates to filter irradiance light. The output intensity of the light can be adjusted at any time via a multichannel direct current supply device so that the property of the solar cell in different load conditions, or in different irradiance or spectral conditions, can be obtained. The typical measurement system using a xenon lamp is classified into to two types: flash light and steady-state light, and both of them should be acquired and set up together according to the requirement. The light source of the measurement system in the disclosure is suitable for a flash operation, which can be used in a solar cell efficiency measurement, and is suitable for a steady-state operation, which can be used in a solar cell aging, hotspot test, NOCT (Nominal Operation Cell Temperature) test, performance at NOCT test, or temperature coefficient test. Therefore, the cost can be saved because only one light source is required. The LED solar simulator can also be used in a light soaking experiment to perform an aging test of the solar cell, since the LED solar simulator of the present invention is configured to provide long periods of irradiance, which is required to measure the irradiance received by and the temperature of an object under test. The solar cell measurement system in the disclosure can be used in the spectrum response measurement of the solar cell. Using more LEDs with different wavelengths in the light source 101 allows a more accurate spectrum response curve to be obtained.

Although the disclosure and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the disclosure , processes, machines, manufacture, compositions of matter, means, methods, or steps, presently existing or later to be developed, that perform substantially the same function or achieve substantially the same result as the corresponding embodiments described herein may be utilized according to the disclosure . Accordingly, the appended claims are intended to include within their scope such processes, machines, manufacture, compositions of matter, means, methods, or steps.

We claim:

1. A measurement system, comprising:
   a light source comprising a plurality of light emitting diodes (LEDs) with different wavelengths, wherein the emission spectrum of the light source complies with a standard, and the standard is IEC-60904-9 ed2.0 or JIS C 8933:2005;
   a holding device configured to hold an object under test; and
   a measurement device configured to measure the electrical properties of the object under test after the object under test is illuminated by the light source, wherein the light source further comprises an optical reflective integrator and no filter, and wherein the optical reflective integrator comprises reflection minors configured to mix light from the LEDs so as to enhance the uniformity of the light source, and a plane on which the reflection minors are arranged is different from a plane on which the LEDs are arranged.

2. The measurement system of claim 1, further comprising a direct current supply device, wherein the direct current supply device has a plurality of driving channels used to drive the plurality of LEDs with different wavelengths and control the intensity or the spectrum of the light source.

3. The measurement system of claim 1, further comprising an irradiance measurement device configured to measure the irradiance of the light source.

4. The measurement system of claim 1, further comprising a temperature measurement device configured to measure the temperature of the object under test.

5. The measurement system of claim 1, wherein the object under test is a solar cell.

6. The measurement system of claim 1, wherein the measurement system comprises a load, and the resistance of the load is adjustable.

7. The measurement system of claim 1, wherein the main wavelength of the LEDs with different wavelengths is selected from the group consisting of 300 to 400 nm, 400 to 700 nm, 700 to 1100 nm and combinations thereof.

8. The measurement system of claim 5, wherein the electrical property comprises the voltage and current properties of the solar cell.

9. The measurement system of claim 1, wherein the light source comprises a light source array, and the light source array comprises at least five LEDs with different wavelengths.

10. The measurement system of claim 1, wherein the light source generates an approximate radiance of 100 to 2000 $W/m^2$.

11. The measurement system of claim 1, wherein the light source comprises a light source array, and the light source array is composed of a plurality of array elements, wherein each array element comprises an LED with a multi-chip package, and the LED with the multi-chip package comprises a plurality of LED chips with different main wavelengths.

12. The measurement system of claim 1, further comprising a temperature control device to control the temperature of the object under test.

13. A solar simulator comprising:
a cooling system;
a holding device configured to hold an object under test;
a light source array attached to the cooling system and configured to generate a light source; and
an optical system configured to enhance the uniformity of illumination at the object under test by the light source array;
wherein the light source array comprises a plurality of light emitting diodes (LEDs) with different wavelengths, the emission spectrum of the solar simulator complies with a standard, and the standard is IEC-60904-9 ed2.0 or JIS C 8933:2005, wherein the light source further comprises an optical reflective integrator, an optical reflective integrator array, or the combination thereof and no filter, and wherein the optical reflective integrator, the optical reflective integrator array or the combination thereof comprises reflection mirrors configured to mix light from the LEDs so as to enhance the uniformity of the light source, and a plane on which the reflection mirrors are arranged is different from a plane on which the LEDs are arranged.

14. The solar simulator of claim 13, wherein the object under test is a solar cell.

15. The solar simulator of claim 13, wherein the cooling system is selected from the group consisting of a metal substrate circuit board, a ceramic substrate circuit board, a cooling fin, and the combination thereof.

16. The solar simulator of claim 13, wherein the arrangement of the LEDs is a periodic arrangement.

17. The solar simulator of claim 13, wherein the main wavelength of the LEDs with different wavelengths is selected from the group consisting of 300 to 400nm, 400 to 700nm, 700 to 1100nm, and combinations thereof.

18. The solar simulator of claim 13, wherein the light source array comprises at least five kinds of LED with different wavelengths.

19. The solar simulator of claim 13, wherein the light source array is composed of a plurality of array elements, and the area of each array element is approximately between 1 cm$^2$ and 50 cm$^2$.

20. The solar simulator of claim 13, wherein the light source array generates an approximate irradiance of 100 to 2000 W/m$^2$.

21. The solar simulator of claim 13, wherein the light source array is composed of a plurality of array elements, each array element comprises an LED with a multi-chip package, and the LED with the multi-chip package comprises a plurality of LED chips with different main wavelengths.

22. The solar simulator of claim 13, wherein the light source array is composed of a plurality of array elements, and each array element at least comprises an LED having fluorescent film.

23. An aging test system for solar cell, the aging test system comprising:
a light source comprising a plurality of light emitting diodes (LEDs) with different wavelengths, wherein the emission spectrum of the light source complies with a standard, and the standard is IEC-60904-9 ed2.0 or JIS C 8933:2005;
a cooling system configured to attach to the light source;
a holding device configured to hold an object under test illuminated by the light source;
an irradiance measurement device configured to measure the irradiance of the light source; and
a temperature measurement device configured to measure the temperature of the object under test, wherein the light source further comprises an optical reflective integrator, an optical reflective integrator array, or the combination thereof and no filter, and wherein the optical reflective integrator, the optical reflective integrator array or the combination thereof comprises reflection mirrors configured to mix light from the LEDs so as to enhance the uniformity of the light source, and a plane on which the reflection mirrors are arranged is different from a plane on which the LEDs are arranged.

24. The aging test system of claim 23, further comprising a direct current supply device, wherein the direct current supply device has a plurality of driving channels used to drive the plurality of the LEDs with different wavelengths and control the intensity or the spectrum of the light source.

25. The aging test system of claim 23, wherein the light source comprises a light source array, the light source array is composed of a plurality of array elements, and each array element comprises at least five LEDs with different wavelengths.

26. The aging test system of claim 23, wherein the light source generates an approximate irradiance of 100 to 2000 W/m$^2$.

27. The aging test system of claim 23, wherein the light source array is composed of a plurality of array elements, each array element comprises an LED with a multi-chip package, and the LED with the multi-chip package comprises a plurality of LED chips with different main wavelengths.

28. A measurement system, comprising:
a light source comprising a plurality of light emitting diodes (LEDs) with different wavelengths, wherein the emission spectrum of the light source complies with a standard, and the standard is IEC-60904-9 ed2.0 or JIS C 8933:2005;
a holding device configured to hold an object under test; and
a measurement device configured to measure the electrical properties of the object under test after the object under test is illuminated by the light source, wherein the light source further comprises an optical reflective integrator array and no filter, and wherein the optical reflective integrator array comprises reflection mirrors configured to mix light from the LEDs so as to enhance the uniformity of the light source, and a plane on which the reflection minors are arranged is different from a plane on which the LEDs are arranged.

29. The measurement system of claim 27, wherein the reflection minors are configured to uniformly mix lights with different wavelengths.

* * * * *